(12) United States Patent
Lundberg et al.

(10) Patent No.: US 10,909,188 B2
(45) Date of Patent: Feb. 2, 2021

(54) MACHINE LEARNING TECHNIQUES FOR DETECTING DOCKETING DATA ANOMALIES

(71) Applicant: Black Hills IP Holdings, LLC, Minneapolis, MN (US)

(72) Inventors: Steven W. Lundberg, Edina, MN (US); Thomas G. Marlow, Cape Elizabeth, ME (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 193 days.

(21) Appl. No.: 16/159,393

(22) Filed: Oct. 12, 2018

(65) Prior Publication Data

US 2020/0117718 A1     Apr. 16, 2020

(51) Int. Cl.
*G06F 7/00* (2006.01)
*G06F 16/93* (2019.01)
*G06K 9/62* (2006.01)
*G06N 20/00* (2019.01)
*G06F 16/35* (2019.01)

(52) U.S. Cl.
CPC .......... *G06F 16/93* (2019.01); *G06F 16/353* (2019.01); *G06K 9/6256* (2013.01); *G06N 20/00* (2019.01)

(58) Field of Classification Search
CPC ....... G06F 16/93; G06F 16/353; G06N 20/00; G06K 9/6256
USPC .................................................. 707/600–899
See application file for complete search history.

(56) References Cited

U.S. PATENT DOCUMENTS

2018/0293678 A1* 10/2018 Shanahan ............ G06N 3/0454

* cited by examiner

*Primary Examiner* — Isaac M Woo
(74) *Attorney, Agent, or Firm* — Schwegman Lundberg & Woessner, P.A.

(57) ABSTRACT

Methods and systems for automatically detecting docketing data anomalies are provided. The method includes storing in a docketing system docketing information for a plurality of matters, each of the plurality of matters including a plurality of activities and a plurality of documents. Retrieving a first document from the plurality of documents associated with a first matter of the plurality of matters. Determining a document type of the first document. Extracting one or more features from the first document and the plurality of activities associated with the first matter. Training a machine learning model, based on the extracted features and the document type of the first document, to determine one or more expected docketing activities for a new document determined to match the document type.

18 Claims, 9 Drawing Sheets

700

| Matter Home | ? | Return to Matter List | | |
|---|---|---|---|---|

701

| Matter | Edit Matter Audit | Special Instructions | | |
|---|---|---|---|---|
| Title | PATENT DOCKETING SYSTEM | | File # | 702 3000.001US |
| Matter Type | Patent | | Country | United States of America |
| Client | Company BH | | Client File # | |
| PIP ID | 271761 | | Post Examination Pub Date | |
| Status | Issued | 704 | Matter Entity Size | Small |
| Date Filed | 3/20/2006 | | Grant Date | Dec 3, 2013 |
| Application # | 12/324,688 | | Patent # | 7,799,999  706 |

MACHINE LEARNING TECHNIQUES FOR DETECTING DOCKETING DATA ANOMALIES

BACKGROUND

The management of patent portfolios involves multiple stages of the patent lifecycle. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force. Patent management tools are used by companies and law firms for active patent matters (e.g., unfiled, pending and issued patent matters) as well as inactive patent matters (e.g., expired, abandoned or closed patent matters) to enable users to efficiently manage patent matters throughout the patent lifecycle.

Many patent management tools include patent docketing capabilities for tracking important due dates for PTO related deadlines and providing a document repository for PTO related correspondences and documents. The patent docketing process may involve (1) storing all key intellectual property information in a centralized and consolidated database; (2) providing access to critical information from documents (e.g., correspondences between law firms and the U.S. PTO, or law firms and clients) and deadlines (e.g., PTO deadlines and non-PTO deadlines); and (3) providing customizable workflows for streaming and automating the patent management processes throughout the patent lifecycle.

Companies and law firms rely on the accuracy of the information contained in the patent management tools to make informed decisions. Oftentimes, docketing information for a matter is manually entered into the docketing system. For example, a new document may be received and uploaded to the matter and a set of activities (e.g., deadlines) associated with the new document are generated for the matter manually. Such a process is prone to errors that can result from manual entry of the information. For example, a human may accidentally enter the wrong title of the document uploaded and generate the wrong set of activities associated with the document for the matter. These types of errors may result in inaccuracies of the docketing system and reduce the overall reliability of the docketing tools and the data.

BRIEF DESCRIPTION OF DRAWINGS

Some embodiments are illustrated by way of example and not limitation in the figures of the accompanying drawings in which:

FIGS. 7-8 are depictions of user interfaces of docketing data, according to an example embodiment.

DETAILED DESCRIPTION

Techniques set forth in this specification enhance reliability and maintain integrity of docketing information entered in a patent management system. Particularly, a machine learning model is trained based on a set of docketing data in the docketing system associated with various matters. The machine learning model is trained to classify documents that are added to the docketing system and to provide an expected set of activities associated with the document. The machine learning model can be applied to a new document added to the docketing system to determine whether the list of activities generated for the matter based on the document matches the expected list of activities. If the list of activities do not match the expected list of activities, the machine learning model determines such an anomaly and can alert or notify an operator. In some embodiments, the machine learning model can be applied to automatically identify a document that is added to a matter in the docketing system and automatically generate a list of activities for the matter based on the document. By ensuring that the data entered in the docketing system is accurate and error free in these ways, the reliability and accuracy of the docketing system is improved.

The systems and methods set forth in this specification are described in relation to a patent management system (such as a patent docketing system) and patent matters, but it will be understood that the present invention could equally be applied to other forms of intellectual property (trademarks, copyright, registered designs, and the like). Moreover, the term "patent" is not intended to be limited to an issued patent, but may include a pending patent application or unfiled application or invention disclosure. The term "user" is intended to cover any person interacting with the patent management system. A user may be an inventor, portfolio manager, business manager, patent attorney, patent paralegal, or patent docketing personnel, for example.

Figure 1:
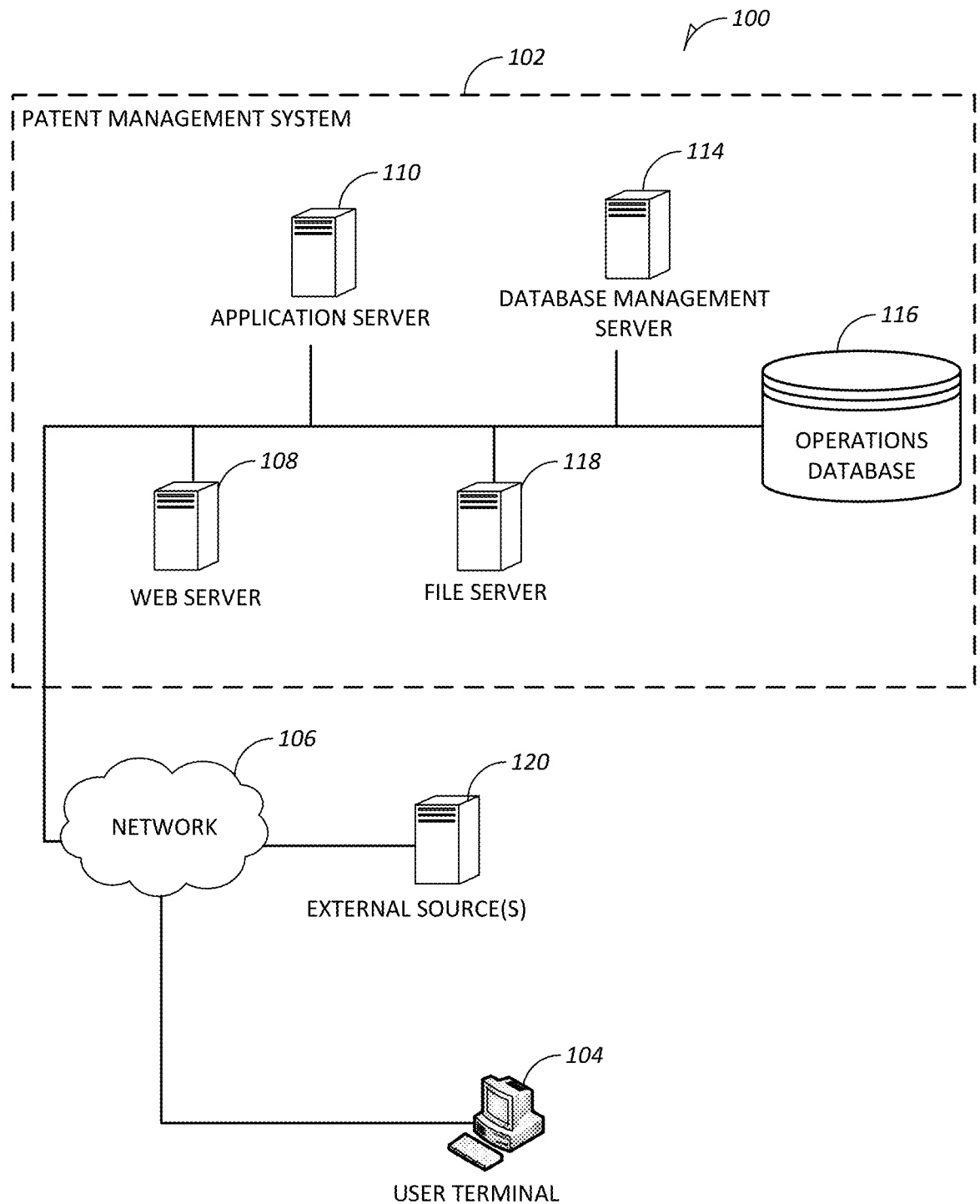
FIG. 1 is a system component diagram, according to an example embodiment.

FIG. 1 is a schematic view of computer network system 100 according to various embodiments. The computer network system 100 includes patent management system 102 and user terminal 104 communicatively coupled via network 106. In an embodiment, patent management system 102 includes web server 108, application server 110, and database management server 114 which may be used to manage at least operations database 116 and file server 118. Patent management system 102 may be implemented as a distributed system, for example one or more elements of the patent management system 102 may be located across a wide-area network (WAN) from other elements of patent management system 102. As another example, a server (e.g., web server 108, file server 118, database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the software components of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114. User terminal 104 enables a user to access a given matter and view one or more new documents uploaded to the matter. The documents may have been automatically retrieved or received from a patent office and uploaded to the matter. The user, through user terminal 104, may enter or verify one or more activities generated for the matter in association with the one or more new documents uploaded to the matter.

Operations database 116 may be composed of one or more logical or physical databases. For example, operations database 116 may be viewed as a system of databases that when viewed as a compilation, represent an "operations database." Sub-databases in such a configuration may include a matter database a portfolio database, a user database, a mapping database, and an analytics database. Operations database 116 may be implemented as a relational database, a centralized database, a distributed database, an object oriented database, or a flat database in various embodiments.

In various embodiments, the patent management system framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system or within the patent management system. Thus, a user may see a matter listed as its patent number while internally a database of the patent management system may identify it by a random number.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Figure 8:
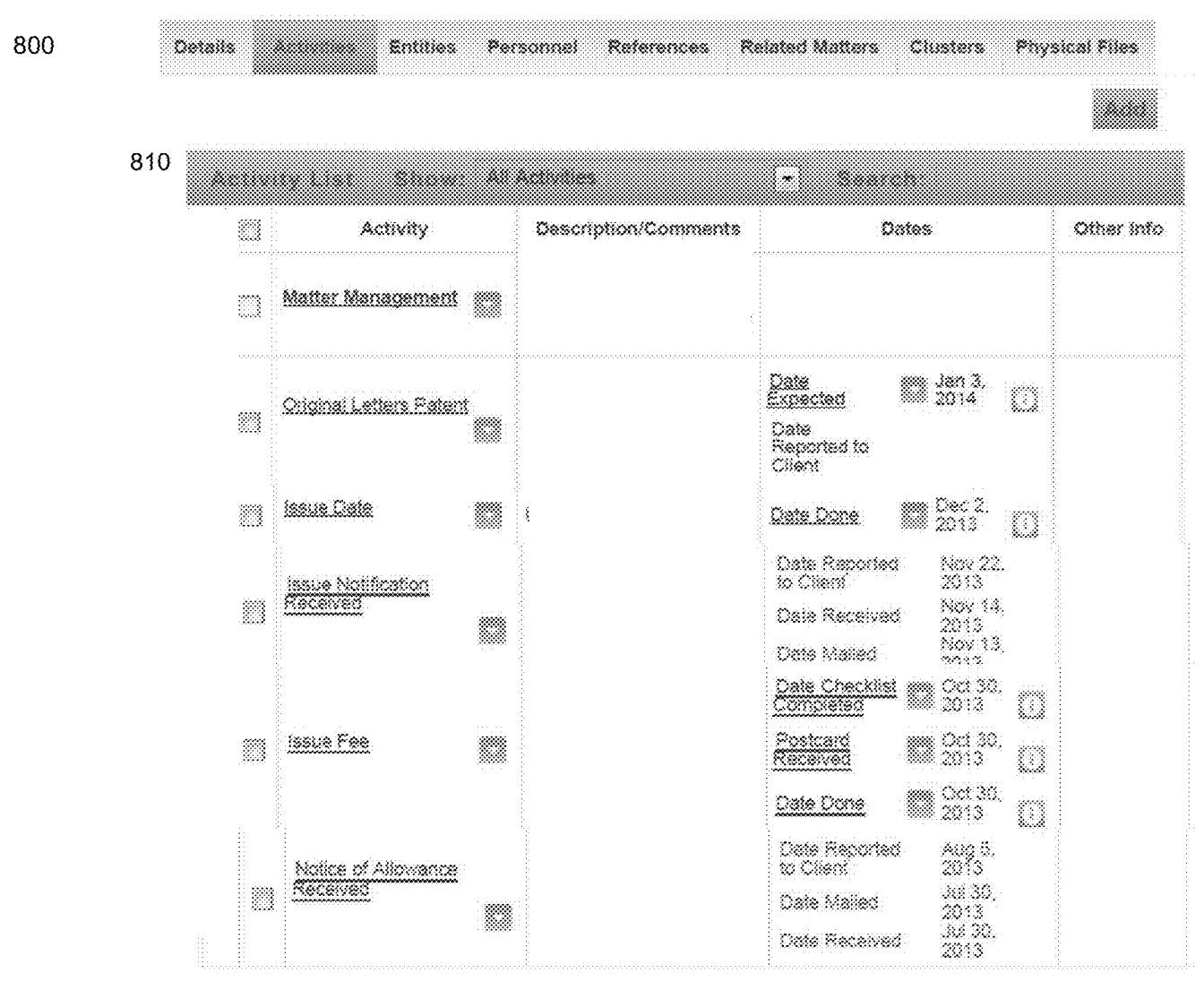

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes and other structures, names, or formats may be used. Additionally, further associations between data stored in the databases may be created as discussed further herein. As referred to herein, docketing information includes bibliographic information, docketing activity information, deadline information, or documents associated with a given matter or portfolio or any other information stored in the patent management system databases. FIG. 7 shows an illustrative user interface 700 of various bibliographic information 701 (such as a matter status 704, file number 702 and patent number 706) associated with a given matter. FIG. 8 shows an illustrative user interface 800 of various activities 810 associated with the given matter.

During operation of patent management system 102, data from multiple data sources (internal and external) may be imported into or accessed by the operations database 116. Internal sources may include data from the various tools of the patent management system. External sources 120 may include publicly available databases such as websites or databases associated with foreign and domestic patent offices, assignment databases, WIPO, and INPADOC. In various embodiments, the data is scraped and parsed from the websites. The data may be gathered using API calls to the external sources 120 when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like. The imported data may also include one or more documents (e.g., a patent office action) associated with the matter. In accordance with various embodiments, the documents may be manually identified by a user via user terminal 104 or may be automatically classified using a machine learning model. After classifying or identifying the document, additional data (e.g., updates to bibliographic information and/or activities) associated with the document may be gathered, retrieved, or generated and stored in association with the given matter.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

In some embodiments, after a document is added to the docketing system and updates to bibliographic information or addition of activities are generated for the matter based on the document, a machine learning model may be applied to the document and the updates or activities added. The machine learning model determines a set of expected changes (e.g., a set of expected activities or updates to the bibliographic information) based on the document and its classification. The machine learning model compares the expected changes to the actual changes and determines whether there is an inconsistency or anomaly. In such cases, the machine learning model alerts or notifies a system operator to take action to correct or may correct the inconsistency automatically.

Figure 2:
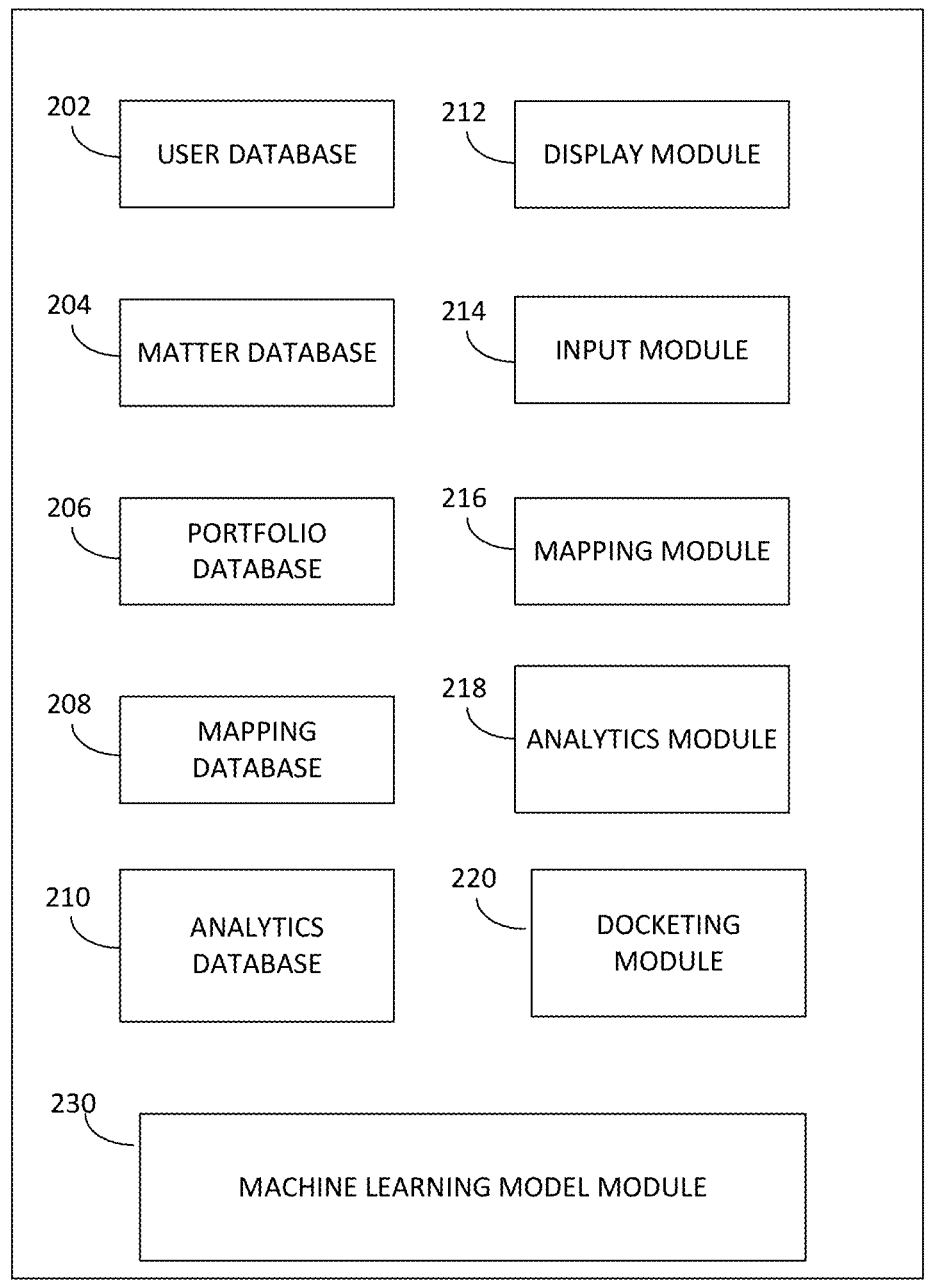
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, docketing module 220, and machine learning model module 230. The components illustrated in FIG. 2 may be implemented by one or more of the components shown in FIG. 1 for patent management system 102. In various embodiments, the data stored in databases 202, 204, 206, 208, and 210 may be in the same or multiple physical locations. Data stored in any of databases 202, 204, 206, 208 and 210 may be referred to as docketing information. For example, portfolio database 206 may be stored in one or more computers associated with a portfolio management service. In various embodiments, patent management system 102 mirrors databases stored in other locations. In an embodiment, when a request is made to access data stored in the databases, patent management system 102 determines where the data is located and directs the request to the appropriate location. Similarly, modules 212, 214, 216, 218, 220 and 230 may be executed across multiple computer systems.

In an embodiment, matter database 204 stores docketing information representing matters as well as file histories, correspondences, and other documents related to patent matters. Each matter may be associated with one or more portfolios. In some embodiments, a matter is associated with no portfolios. In various embodiments, a matter is a foreign or domestic patent or application. Matters may also be inventions that have not yet been filed. In an embodiment, docketing information in a matter entry includes bibliographic fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, customer or client instructions, and annuity information (e.g., due date, country, and amount due). In an embodiment, docketing information in a matter entry includes activity fields representing a list of activities from oldest to newest including upcoming due dates and past completed activities. Activities may include disclosure receipt, application filing, office actions received, office action responses filed, allowances received, issue fee payments, patent expiration, maintenance fees, etc.

More or fewer data fields associated with a patent may be included in a matter entry stored in matter database 204. In an example embodiment, matter database 204 may store a patent matter database, wherein this database includes patent matter data and related documents and communications. For an example embodiment, a complete list of docketing activity templates is stored in a table in matter database 204 and/or analytics database 210.

In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any docketing information pertaining to patents or patent applications, such as serial numbers, title, cited art, inventor or assignee details and the like. Data received from a source docketing system may also be compared with corresponding data scraped and parsed from publicly available databases or websites in a similar manner before being imported or integrated into the target docketing system. As the data is gathered, scraped, parsed and imported, the data is checked for errors or anomalies before or after being imported using a machine learning model trained in the manner described in connection with FIG. 6.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio database 206, in an example embodiment, stores data representing portfolios of one or more matters. Data stored in portfolio database 206 may have been previously generated the patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 206.

For various embodiments, a portfolio may represent all matters associated with a particular law firm, client, technology or other grouping of matters. By grouping portfolios in this manner, the docketing processes for docketing the next most probable docketing activity may be customized or tailored for a particular client or law firm. For example, a law firm managing portfolios of several clients, may decide to tailor their docketing process flows for the individual clients based on the client's internal intellectual property procedures. This may require the law firm to add customized docketing activity templates to track non-PTO activities.

In various embodiments, mapping database 208 may include mappings of patent concepts to one or more matters. For example, the mapping module 216 is configured to facilitate mappings to associate at least one response due date or other date (e.g., date mailed) with the at least one downloaded document.

In an embodiment, display module 212 is configured to display user interfaces and information retrieved from one or more databases 202-210. If a user is accessing patent management system 102 remotely (e.g., through a web browser), display module 212, representing a user-interface through a network to a user terminal, may be configured to transmit data. In various embodiments, display module 212 may present patent matters bibliographic details, as shown in FIG. 7 and various docketing activities docketed including relevant dates for patent matters, as shown in FIG. 8. Furthermore, docketing data may be entered, through input module 214, into the user interface fields shown in FIGS. 7-8.

In various embodiments, input module 214 receives data from multiple sources where it may be further processed by one or more other modules and stored in one or more of databases 202-210. In various embodiments, input module 214 of the patent management system 102 may comprise a search engine (not shown) for conducting searches at a patent registry or on the Internet. For example, input module 214 may be configured to utilize one or more APIs to data from one or more patent data stores or publicly available databases (e.g., public PAIR, private PAIR, INPADOC, foreign patent offices, patent docketing systems, portfolio management systems, etc.). The data may include published patent documents, patent applications, office actions or other patent office correspondences, prior art references, dockets dates, annuity payment data and patent or patent application assignment information. Specific assignment data may include details pertaining to the assignor or assignee (e.g. name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is configured to receive input from one or more user interface elements. For example patent management system 102 may present multiple user interfaces to a user. These user interfaces may enable users to input data directly into databases 202-210, instruct the patent management system to retrieve data from patent data stores, and instruct the patent management system to perform various operations (e.g., analysis) on the data in databases 202-210.

Additionally, input module 214 may be configured to determine the selection of one or more user interface elements by a user and initiate the action associated with the selected user interface element. In other example embodiments, input module 214 may be configured to receive user input to select patent matters and patent activity templates for docketing, and then provide the necessary information to update the patent activity templates to generate the docket due dates or other due dates to implement the user's patent management workflows.

In various embodiments, input module 214 processes the data that has been inputted and formats it according to the data fields of databases 202-210 as discussed above. In various embodiments processing is completed using a parsing module (not shown). For example, consider a patent publication that a user has directed to be inputted into one or more of the databases. The parsing module may use a combination of automatic image recognition, a machine learning model, and text analysis to determine the filing date, issue date, title, abstract, and claims of the patent and classify the document. In some embodiments, the parsing module may flag certain pieces of data that had been determined to be potentially inaccurate (e.g., a number could not be read). A user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments the parsing module may parse multiple pieces of information before generating a database entry. For example, input module 214 may receive a docket number for an issued patent. The docket number may be combined with the information parsed from the issued patent to form an entry in matter database 204.

In various embodiments, the docketing module 220 is configured to provide template-based docketing of activities for patent matters with country-law-based due date calculations and customizable workflows to automate docketing activities as needed. The docketing module 220 includes docketing activity templates for the various PTO activities and other templates for non-PTO activities for managing PTO and non-PTO due dates and activities, both of which can be pre-defined by the system or customized by users to implement the desired patent docketing workflows. Examples of non-PTO templates and docketing activities include the tracking of due dates for managing internal tasks within a law firm or corporate patent department, or tracking correspondences to-and-from foreign associates who are the registered agents for the patent matters in their respective PTO. The docketing module 220 may automatically generate a list of activities using the activity templates based on the document received from input module 214. The docketing module 220 may communicate with machine learning model module 230 to determine the expected list of activities associated with the document. The docketing module 220 may determine whether the expected list of activities matches the generated list of activities to detect an anomaly. In some cases, the docketing module 220 may automatically generate the list of activities for a given document based on the expected list of activities for the given document as determined by the machine learning model module 230.

Several key decisions such as filing international applications or filing divisionals/continuations/CIPs, and annuity payment review can be triggered directly from docketing module 220. The docketing module 220 calculates the deadlines based on filing, prosecution, and grant dates for each patent matter or other prosecution dates (e.g., date mailed, date received, etc.), jurisdiction and applicable laws and applicable, and type of filing. Furthermore, the docketing module 220 is updated with the applicable country laws for all major countries as needed. Additionally, the docketing module 220, together with display module 212 and input module 214, provides an interface for users to appropriately input docketing data required (including the selection of the next most probable docketing activity) for docketing and due date generation into the relevant fields. After the docketing data is input, in some embodiments, the machine learning model module 230 is applied to the document pertaining to the docketing data that is input to determine whether the input docketing data matches the expected docketing data.

For example, if a final office action is the document, the docketing data that is input may be a single activity of a response due deadline having a 3-month due date from the date the final office action is received. The machine learning model module 230 may determine that the excepted list of activities for the final office action includes a first activity of the response due date having the 3-month due date from the date the final office action is received and a second activity for filing a notice of appeal on the 6-month due date from the date the final office action is received. Because only one activity was generated for the received final office action, the machine learning model module 230 may either add the missing second activity (notice of appeal filing deadline) and/or alert a system operator about the anomaly.

Tracking statutory deadlines and storing PTO correspondences is critical for managing patent portfolios effectively. Several PTO offices provide electronic data access for filing, prosecution, and maintenance-related activities, which can be accessed by the docketing module 220 via input module 214, which may have an electronic interface, such as an API, for fully or partially automating the downloading of documents and correspondences from the PTOs and/or uploading and docketing in the user's patent management or docketing system. The PTO correspondences are stored in matter database 204 and can be retrieved thru input module 214 by the user.

In some embodiments, documents that are received by input module 214 may be classified according to the country to which they pertain. For example, a Patent Cooperation Treaty (PCT) document may be associated with a PCT matter and a U.S. PTO document may be associated with a U.S. matter. In certain cases, documents may be automatically classified to determine automatically the country to which they pertain and uploaded to the corresponding matter. The machine learning model module 230 may receive a document and may classify the document as PCT or non-PCT and/or may classify the country associated with the document. The machine learning model module 230 may be trained to classify the documents as corresponding to a given country based on various factors or features including format, language, foreign agent information, and patent office location information in the document. If the machine learning model module 230 classifies the document as PCT, the document is automatically associated with the corresponding PCT matter and uploaded to the PCT matter. If the document is classified as non-PCT, the document may undergo further processing (e.g., text recognition) to determine the specific country or may be flagged for review by a system operator to be associated with the appropriate country. The disclosed techniques train the machine learning model module 230 to classify received documents by type and/or by country using the process described below in connection with FIGS. 3-5. For example, the machine learning model module 230 may extract features from a collection of documents and based on the features may be trained to classify documents as office actions, responses, filing receipts, notices of allowance, etc. The machine learning model module 230 may also be trained to classify the country associated with the documents based on the extracted features.

Patent docketing systems may be maintained or updated automatically, as described above, or by patent docketing specialists who performs docketing and upload documents and correspondences into the patent management system 102 as PTO correspondences are received. Furthermore, the patent management system needs to be updated with information and docketing activities as patent attorneys, agents or paralegals complete patent activities, such as filing various responses with the U.S. PTO. The patent docketing process requires trained patent docketing specialists, who understand the patent lifecycle and PTO rules and regulations to properly docketed patent matters as responses or other documents are filed with the PTO, or received from the PTO, to docket PTO activities. Other non-PTO activities may also be important to docket, for example, law firms docket their internal processes for implementing their client requested procedures or correspondences with foreign associates who communicate and file responses directly with their respective foreign patent offices.

As discussed below, machine learning model module 230 (e.g., machine learning technique, algorithm or process) analyzes a collection of matters stored in a docketing system and is trained to generate an expected set of activities for a given document. In some cases, machine learning model module 230 is trained or updated as each new document is uploaded and the corresponding set of activities are generated and verified for the matter. In this way, the machine learning model module 230 is always up-to-date with the latest set of information about the expected set of activities that are needed for a given document as rules, laws and practices change. In particular, machine learning model module 230 may extract a set of features from a given document and a set of activities in a matter. For example, the machine learning model module 230 may extract as the features titles of activities and documents, classification or types of the documents, dates of the activities and the documents, status information, and/or deadlines. The machine learning model module 230 may form relationships between when the extracted features to determine the expected activities associated with a given document.

For example, the machine learning model module 230 may determine which activities were generated and when as a result of what type of document that was added to the matter around or close to the timing of the activities (e.g., within a few or less than a specified number of days). In this way the machine learning model module 230 is trained to recognize documents and their corresponding expected activities. After being trained, the machine learning model module 230 is applied to a new document that is added for another matter to determine the type of document and whether the set of activities generated based on that type of document match the expected set of activities. If the activities match, then the data was corrected entered and if not, the machine learning model module 230 detects an anomaly. In certain embodiments, the machine learning model module 230 is applied to a new document that is added to a matter to automatically populate a list of activities in the matter based on the expected set of activities associated with the type of document.

Figure 3:
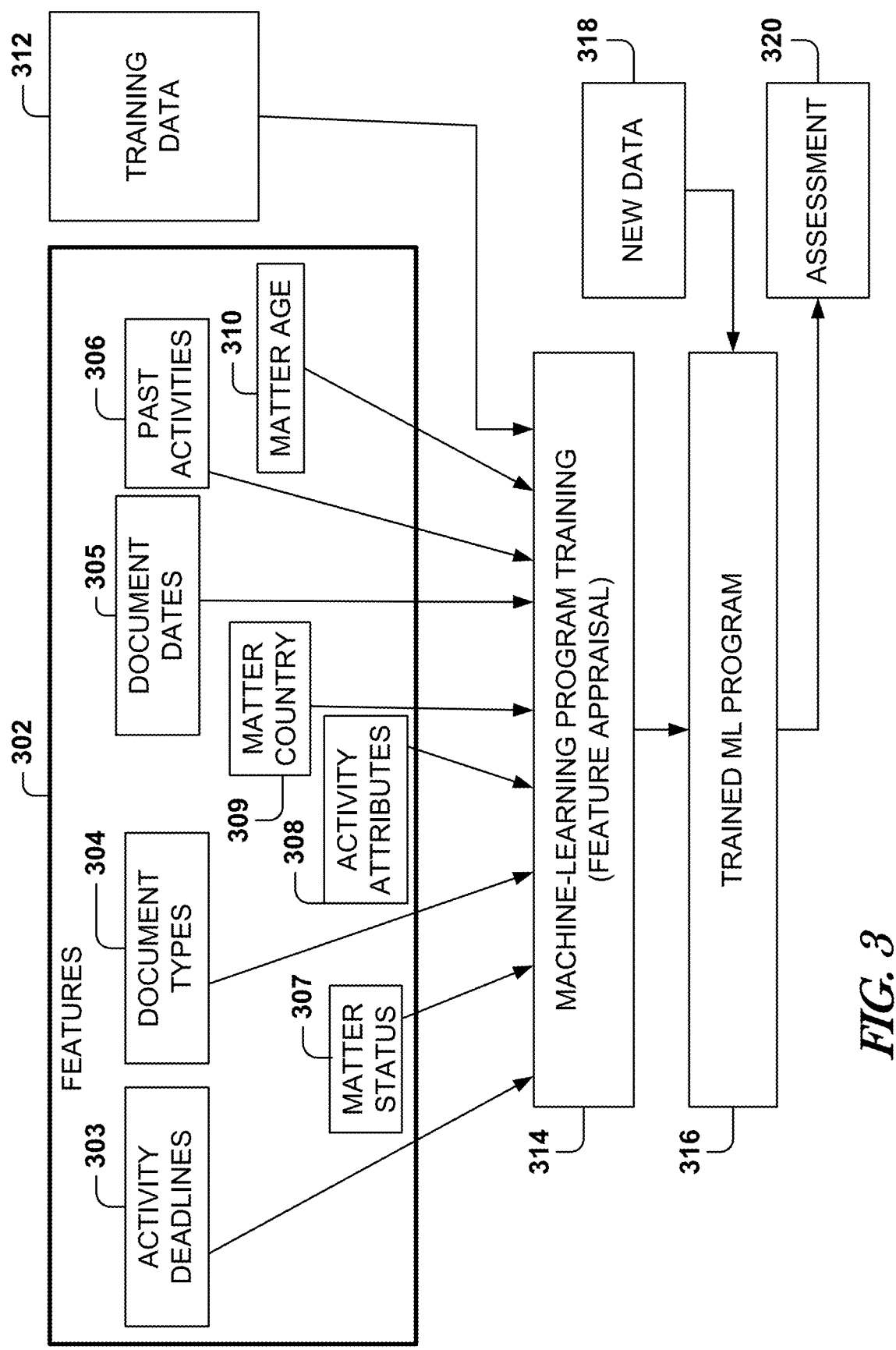
FIG. 3 is a block diagram of a process for training and applying a machine learning model to detect docketing data anomalies, according to an example embodiment.

FIG. 3 illustrates the training and use of a machine-learning program or model, according to some example embodiments. In some example embodiments, machine-learning programs (MLPs), also referred to as machine-learning algorithms, models, techniques, or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data.

Such machine-learning tools operate by building a model from example training data 312 in order to make data-driven predictions or decisions expressed as outputs or assessments 320. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying docketing data or documents and predicting or generating a list of expected docketing activities associated with the docketing data or documents.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a list of expected activities for a type of document or classification of the document. The document may be automatically classified to determine the type of document using the machine learning algorithms or the type or classification of the document may be specified by a user. The machine-learning algorithms utilize the training data 312 to find correlations among identified features 302 that affect the outcome.

The machine-learning algorithms utilize features 302 for analyzing the data to generate assessments 320. A feature 302 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 302 may be of different types and may include one or more of activity deadlines 303, document types 304, document dates 305, past activities 306, matter status 307, matter country 309, activity attributes 308, matter age 310, and/or any other suitable docketing information stored for a given matter.

The machine-learning algorithms utilize the training data 312 (e.g., docketing data, activities, and documents associated with various matters) to find correlations among the identified features 302 that affect the outcome or assessment 320. In some example embodiments, the training data 312 includes labeled data, which is known data for one or more identified features 302 and one or more outcomes, such as a list of activities associated with a country or document type or image attributes unique to a certain country.

With the training data 312 and the identified features 302, the machine-learning tool is trained at operation 314. The machine-learning tool appraises the value of the features 302 as they correlate to the training data 312. The result of the training is the trained machine-learning program 316.

Once the training data 312 are collected and processed (e.g., subjected to image feature extraction, dimensionality reduction techniques, etc.), a machine learning program 316 can be trained and built using either statistical learning or machine learning techniques. In one embodiment, regression analysis can be used to build the machine learning program 316. Regression analysis is a statistical process for estimating the relationships among variables. There are a number of known methods to perform regression analysis, for example: linear regression or ordinary least squares regression, among others, are "parametric" in that the regression function is defined in terms of a finite number of unknown model parameters that can be estimated from training data 312. For an expected activity list generation associated with a given document type, a regression model can be defined, for example, as $H \approx f(X,\beta)$, where "H" denotes the expected list of activities, "X" denotes a vector of input variables (e.g., any one of features 302), and "$\beta$" denotes a vector of unknown parameters to be determined or trained for the regression model.

Training data 312 that include docketing activities and documents for various matters provide a set of known H values (e.g., a verified list of activities associated with a document for a given matter or a set of image features associated with a given country) having corresponding X values (e.g., feature vectors (e.g., features 302) extracted from the docketing activities and documents of same training matter). Using these data, the model parameter $\beta$ can be computed using data fitting techniques such as least squares, maximum likelihood or the like. Once $\beta$ is estimated, the model can then compute H (e.g., expected list of activities or classification of a document) for a new set of X values (e.g., feature vectors (features 302) extracted from a new document added to a given matter or received from a source).

In another embodiment, machine learning and supervised learning can be used for building the machine learning program 316. Supervised learning is a branch of machine learning that infers a prediction model given a set of training data. Each sample of the training data is a pair consisting of input data (e.g., a vector of measurements or features 302) and a desired output value (also called a supervisory signal). A supervised learning algorithm analyzes the training data 312 and produces a predictor function, which is a regression function when the output variable is numeric or is continuous. Consistent with disclosed embodiments, many different algorithms can be applied, including but not limited to: kNN (k-nearest neighbors) regression, support vector machines, neural networks, decision trees, random forests, and gradient boosting machines.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

When the machine-learning program 316 is used to perform an assessment, new data 318 is provided as an input to the trained machine-learning program 316, and the machine-learning program 316 generates the assessment 320 as output. For example, when a new document is received or added to a matter, the machine learning program 316 analyzes the document to classify the document, determine its type and/or generate a list of expected activities for the document by extracting features from the document and docketing data in the matter. The machine learning program 316 may compare the expected activities to the activities generated for the matter based on the document to detect an anomaly. In some cases, the machine learning program 316 may determine whether the document was added to the correct country or matter by classifying the document as PCT or non-PCT.

Machine learning models may be run against training data 312 for several epochs (e.g., iterations), in which the training data 312 is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training data 312 may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some example embodiments, the machine learning model module 230 includes, or is trained by, a neural network (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the docketing documents in a matter are related to one another and to the activities in the matter.

For example, an LSTM serving as a neuron includes several gates to handle input vectors (e.g., features 302), a memory cell, and an output vector (e.g., activities associated with a document). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features 302 for analyzing the data to generate assessments (e.g., predicting or generating an expected list of activities for a given document type or classifying a given document).

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 4:
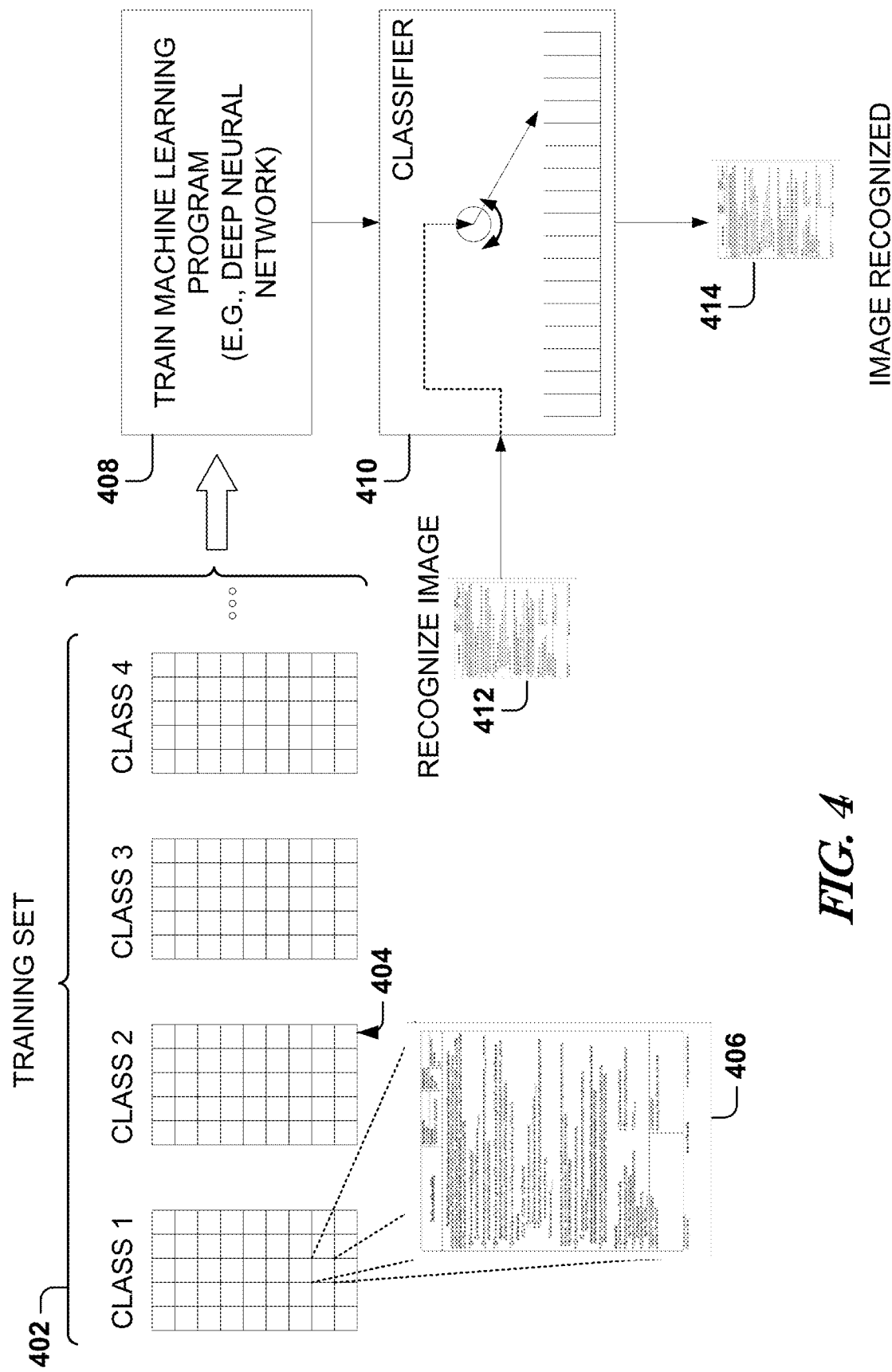
FIGS. 4 and 5 are block diagrams of a process for training and applying a classifier to classify images, according to an example embodiment.

FIG. 4 illustrates the training of a classifier, according to some example embodiments. A machined-learning algorithm is designed for recognizing docketing documents, and a training set 402 includes data that maps a sample to a class 404 (e.g., a class includes all the images of certain class of documents). The classes may also be referred to as labels. Although embodiments presented herein are presented with reference to object recognition, the same principles may be applied to train machine-learning programs used for recognizing any type of items.

The training set 402 includes a plurality of images of for each class (e.g., image 406), and each image is associated with one of the categories to be recognized (e.g., a class). The classes may identify types of documents (office action, notice of allowance, patent application, filing receipt, restriction requirement) and/or countries of the documents (e.g., PCT or non-PCT). The machine-learning program is trained 408 with the training data to generate a classifier 410 operable to recognize images. In some example embodiments, the machine-learning program is a DNN.

When an input image 412 is to be recognized, the classifier 410 analyzes the input image 412 to identify the class (e.g., class 414) corresponding to the input image 412.

Figure 5:
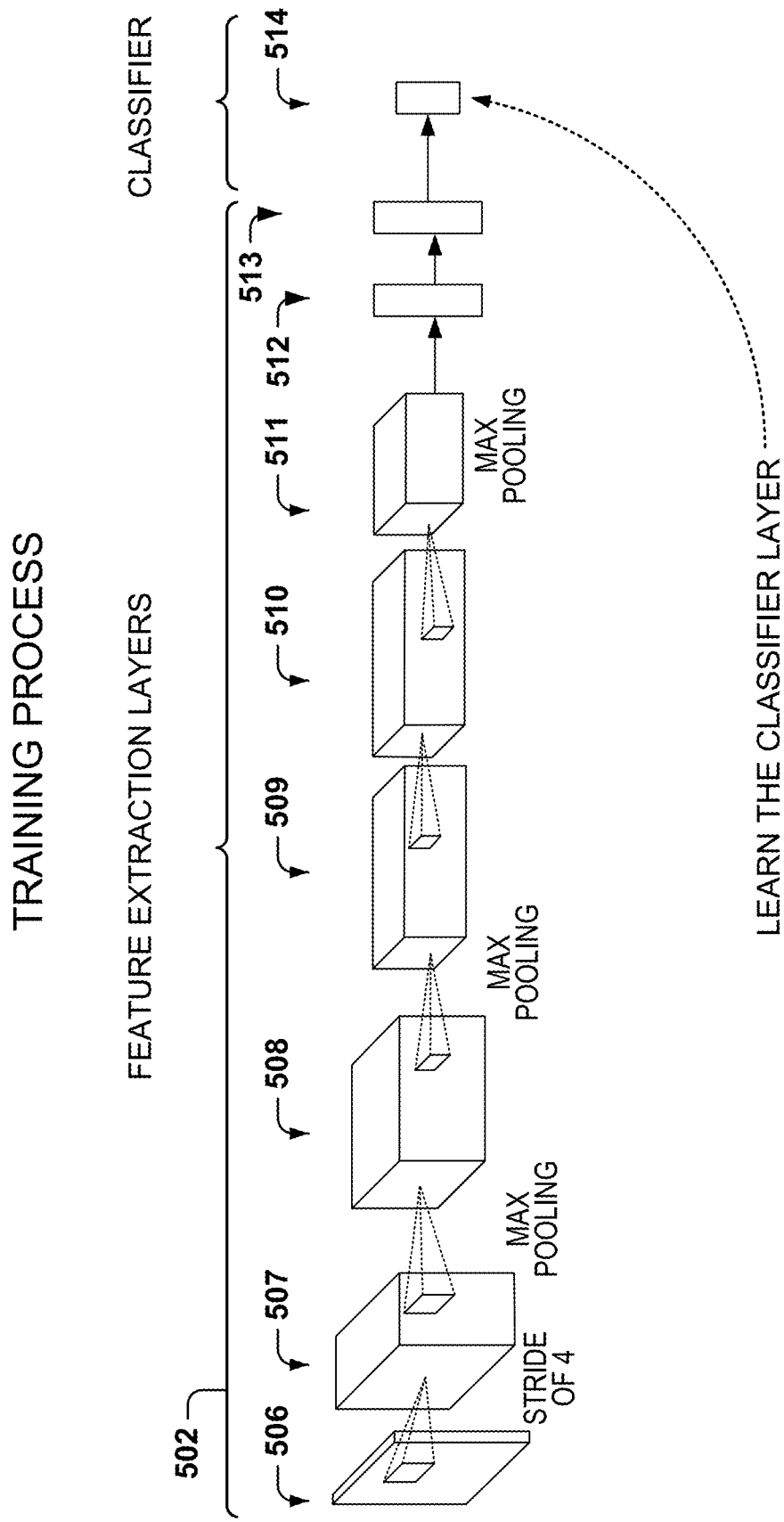

FIG. 5 illustrates the feature-extraction process and classifier training, according to some example embodiments. Training the classifier may be divided into feature extraction layers 502 and classifier layer 514. Each image is analyzed in sequence by a plurality of layers 506-513 in the feature-extraction layers 502.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 214. In FIG. 5, the data travels from left to right and the features are extracted. The goal of training the neural network is to find the parameters of all the layers that make them adequate for the desired task.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

Figure 6:
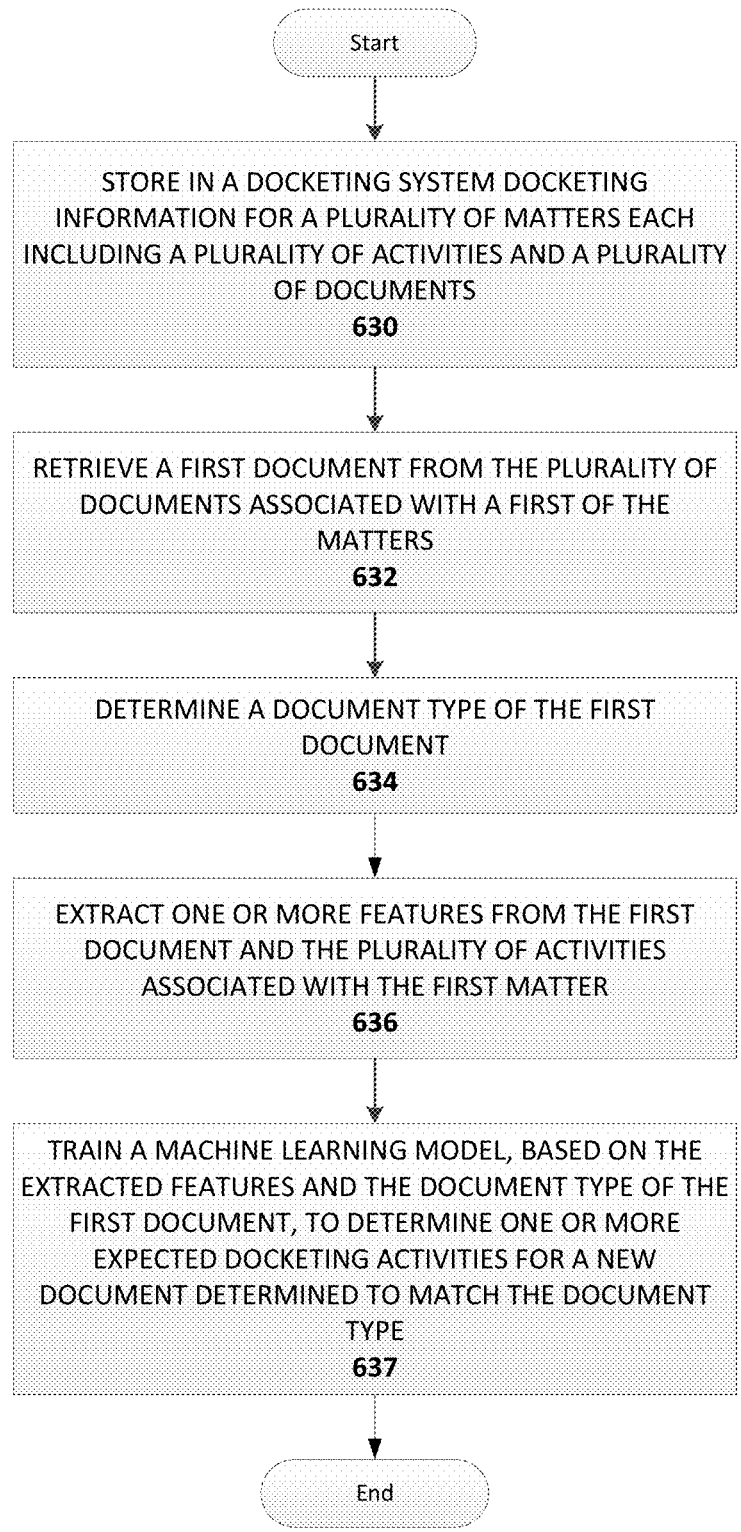
FIG. 6 is a block diagram showing a process for training a machine learning model to detect docketing data anomalies, according to example embodiments.

FIG. 6 is a block diagram showing a process 602 for training a machine learning model to detect docketing data anomalies, according to example embodiments. The operations discussed below in connection with FIG. 6 may be performed in any order or may be omitted entirely. The operations of FIG. 6 may be a set of non-transitory or transitory computer readable instructions that machine learning model module 230 may execute to be trained to classify a document, determine a list of expected activities for a document, and determine whether a set of activities in a matter for a document match the expected list of activities.

At operation 610, patent management system 102 stores docketing information for a plurality of matters, each of the plurality of matters including a plurality of activities and a plurality of documents. For example, an input module 214 may receive a plurality of matters in a portfolio and populate activity information and documents associated with these matters. The matters may be received by way of manual user input including data verification and/or by downloading the docketing information from respective patent websites (e.g., US Patent Office).

At operation 632, machine learning model module 230 retrieves a first document from the plurality of documents associated with a first matter of the plurality of matters. For example, in a process of training machine learning model module 230 according to the described process of FIG. 3, the machine learning model module 230 may select a first matter and retrieve a given document (e.g., an Office Action) that is stored in the first matter. In another example, the machine learning model module 230 may select another matter or another document (e.g., a patent application filed) in the first matter.

At operation 634, machine learning model module 230 determines a document type of the first document. For example, machine learning model module 230 may access data stored in the matter that identifies the title or type of the document. For example, the data may specify that the selected document is an Office Action. In another example, after being trained (e.g., by way of FIGS. 4-5), the machine learning model module 230 may automatically identify the type of the document that has been retrieved. For example, using image processing and extracting object features from the selected document, the machine learning model module 230 may determine that the features correspond to an Office Action. As such, the machine learning model module 230 may determine that the retrieved document is classified as an Office Action.

At operation 636, machine learning model module 230 extracts one or more features from the first document and the plurality of activities associated with the first matter. For example, machine learning model module 230 may extract any one or more of the features 302 from the first document. In one example, machine learning model module 230 may extract a title of the document and a date of the document. The machine learning model module 230 may also access the matter to retrieve a set of activities past and present stored in the matter. For example, the machine learning model module 230 may identify 1) a response due date set to 3-months after the date of the selected document, 2) a restriction requirement that has a date that precedes the date of the selected document in the activities list and 3) a response to the restriction requirement that has a date that precedes the date of the selected document in the activities list. The machine learning model module 230 may perform similar analysis and feature retrieval for all or most of the matters stored in the patent system to establish relationships between documents and activities.

At operation 637, machine learning model module 230 trains a machine learning model, based on the extracted features and the document type of the first document, to determine one or more expected docketing activities for a new document determined to match the document type. For example, the machine learning model module 230 may determine that the expected docketing activities for Office Action type of documents includes a 3-month response due date from the date specified on the document. The machine learning model module 230 may also determine, based on the extracted features, that Office Action type of documents and response due dates for office actions activities always come after and never before restriction requirements. In this way, when applied to a new document that is an office action added to a matter, the machine learning model module 230 may detect an anomaly if a response to restriction requirement due date is specified in the activities list following the date of the office action.

In another example, the machine learning model module 230 may extract features from the document (e.g., checkboxes being checked or unchecked) and be trained to establish a relationship between activities in the matter that follow the date of the document and the checkboxes. For example, the machine learning model module 230 may be trained to determine that when a checkbox in a certain position of a certain type of document (e.g., an Office Action or Notice of Allowance) is checked, a certain type of activity (due date) is generated that is not generated when the checkbox is not checked. Similarly, the machine learning model module 230 may be trained to determine that when a checkbox in an another position of a certain type of document (e.g., an Office Action or Notice of Allowance) is not checked, a certain type of activity (due date) is generated that is not generated when the checkbox is checked. In such circumstances, when the same type of document is detected as newly uploaded in a matter, the machine learning model module 230 may process the document and access the feature (e.g., checkbox in the specified position) of the document to determine whether the checkbox is checked or not. If the machine learning model module 230 determines that the checkbox is checked, the machine learning model module 230 may determine whether the expected activity for the checkbox being checked is included in the matter. If not, the machine learning model module 230 may automatically generate the activity for inclusion in the matter or flag the matter for review by an operator.

As an example, an Office Action may include a checkbox indicating that drawings in a patent application were accepted. If the checkbox is checked, the drawings have been accepted and no further action is due by the practitioner. If the checkbox is not checked, new or replacement or formal drawings need to be submitted by a certain date. As such, an activity including submission of formal drawings may be generated following the date of the Office Action. In such circumstances, the machine learning model module 230 may be trained identify an Office Action type of document and extract the checkbox feature to determine whether the checkbox for the drawings being accepted was checked. If the machine learning model module 230 determines that the feature indicates that the checkbox is not checked in the document, the machine learning model module 230 may access the list of activities following the date of the Office Action to determine whether the submission of formal drawings activity is included. If this activity is not included and is expected to be included because the checkbox for the drawings being accepted was not checked, the machine learning model module 230 may add the activity or notify an operator about the anomaly.

In another example, the machine learning model module 230 may extract features from the bibliographic information of the matter and be trained to establish a relationship between a given status and activities. For example, the machine learning model module 230 may be trained to determine that when a matter has a pending status, a reissue deadline is never included in the list of activities. Similarly, the machine learning model module 230 may be trained to determine that when a matter has an issued status, a reissue deadline is always included in the list of activities. In such circumstances, when a change to a status of the matter is detected as going from unfiled to pending, the machine learning model module 230 may process the status change as being pending from unfiled as the feature to determine whether a reissue deadline is included in the list of activities. If the reissue deadline is included in the list of activities, the machine learning model module 230 may flag the matter for review by an operator.

In another example, the machine learning model module 230 may extract features from the bibliographic information of the matter and be trained to establish a relationship between age of a matter and activities in the matter. For example, the machine learning model module 230 may be trained to determine that when a matter has a filing date that is greater than two years old (e.g., is more than two years in the past relative to the current date), a check status task included in the list of activities. In such circumstances, when the system detects that a matter reaches a certain age greater than two years (e.g., the matter was opened more than two years ago), the machine learning model module 230 may process the age of the matter as the feature to determine whether check status is included in the list of activities. If the check status is not included in the list of activities, the machine learning model module 230 may flag the matter for review by an operator.

In another example, the machine learning model module 230 may extract features from the document (e.g., a patent number) and be trained to establish a relationship between bibliographic information in the matter and the type of document and the features in the document. For example, the machine learning model module 230 may be trained to determine that when an issue notification is received (a type of document), a patent number is always included in the issue notification and the bibliographic information is updated to include the patent number in the issue notification and the status of the matter is changed to issued. Similarly, the machine learning model module 230 may be trained to determine that when a matter is of the pending status, the patent number field of the bibliographic information is always empty. In such circumstances, when the same type of document (e.g., an issue notification) is detected as newly uploaded/received in a matter, the machine learning model module 230 may process the document and access the feature (e.g., the patent number) of the document to determine whether the patent number field in the bibliographic information for the matter matches the patent number feature and if the status field has been changed to issued from pending. If the patent number field does not match the patent number in the issue notification or if the status has not been changed to issued from pending, the machine learning model module 230 may notify an operator or may make the corresponding changes automatically. If the machine learning model module 230 determines that the matter is still pending and an issue notification has not been received, the machine learning model module 230 may determine whether the patent number field is empty in the matter. If not, the machine learning model module 230 may notify an operator or may make the corresponding changes automatically.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations (e.g., from processes 601 and 602) may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
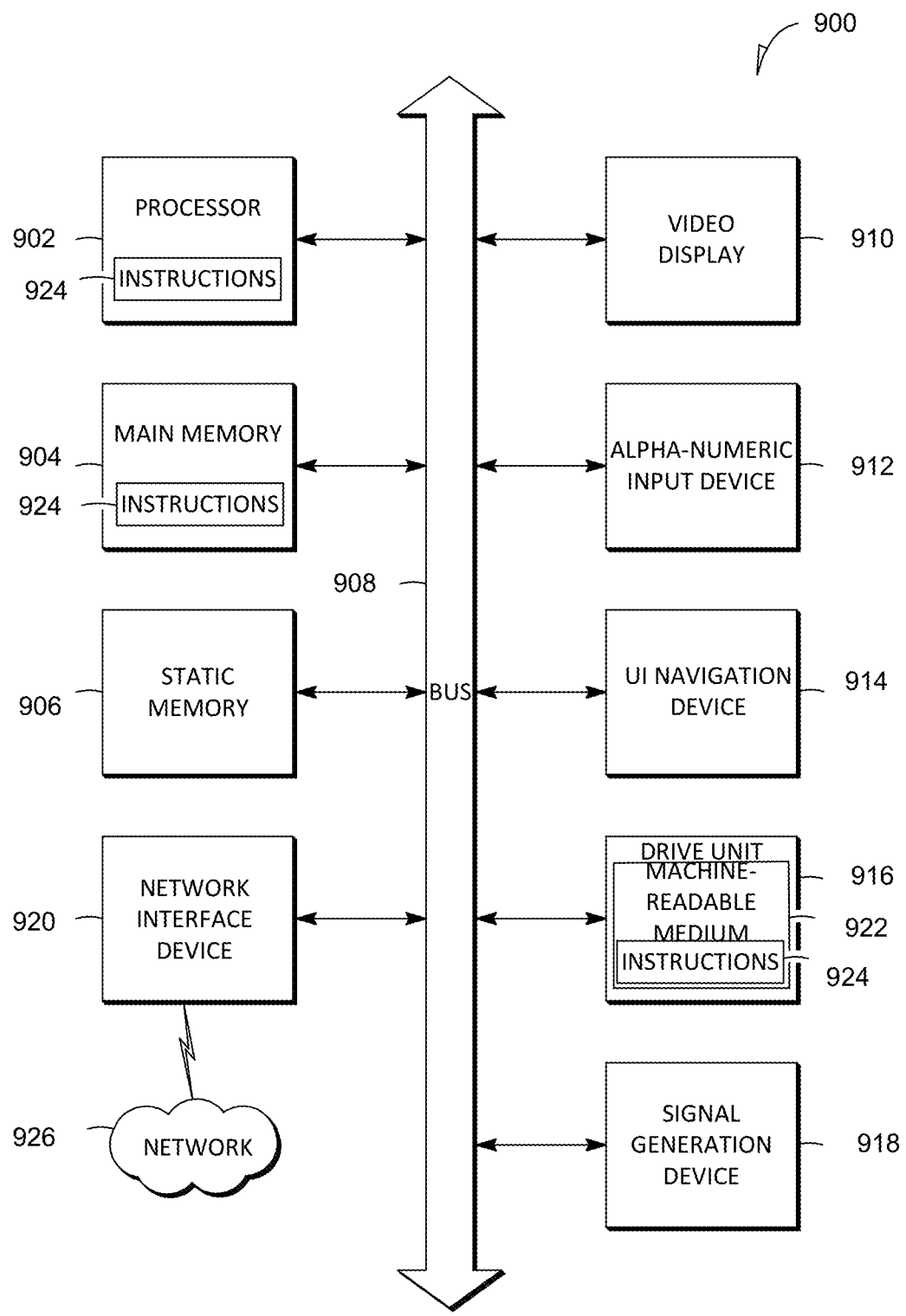
FIG. 9 is a block diagram of machine in the example form of a computer system within which a set of instructions, for causing the machine to perform any one or more of the methodologies herein discussed, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top block (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a non-transitory machine-readable medium 922 on which is stored one or more sets of non-transitory instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Note on the Abstract

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for automatically detecting docketing data anomalies, the method comprising:
   storing, in a docketing system, docketing information for a plurality of matters, each of the plurality of matters including a plurality of activities and a plurality of documents;
   receiving a first document of the plurality of documents;
   identifying one or more docketing activities, associated with the first matter, that are generated in response to receiving the first document;
   retrieving the first document from the plurality of documents associated with a first matter of the plurality of matters;
   determining a document type of the first document;
   extracting one or more features from the first document and the plurality of activities associated with the first matter, the one or more features that are extracted comprising the one or more docketing activities and a title of the first document; and
   training a machine learning model, based on the extracted features and the document type of the first document, to determine one or more expected docketing activities for a new document determined to match the document type.

2. The method of claim 1, further comprising identifying one or more deadlines, associated with the first matter, that are generated in response to receiving the first document, wherein the one or more features include the one or more deadlines.

3. The method of claim 1 further comprising determining a sequence of the one or more activities, wherein the one or more features include the sequence of the one or more activities.

4. The method of claim 1 further comprising determining a status or age of the first matter, wherein the age is determined based on a filing date associated with the first flatter, and wherein the one or more features include the status or age of the first matter.

5. The method of claim 1 further comprising:
   receiving a second document associated with a second matter of the plurality of matters;
   obtaining a list of docketing activities generated for the second matter in response to receiving the second document;
   applying the trained machine learning model to the second document to determine one or more expected docketing activities for the second document; and
   detecting a docketing anomaly in response to determining that the obtained list of docketing activities does not match the one or more expected docketing activities for the second document.

6. The method of claim 1 further comprising:
   training the machine learning model, based on the one or more features extracted from the first document, to classify a country associated with the first document.

7. The method of claim 6, wherein the classifying the country associated with the first document comprises classifying the first document as a Patent Cooperation Treaty (PCT) document or other document.

8. The method of claim 6 further comprising:
   receiving a second document;
   determining that the second document has been associated with a given country;
   applying the trained machine learning model to the second document to determine an expected country for the second document; and detecting a docketing anomaly in response to determining that the given country associated with the second document does not match the expected country for the second document.

9. The method of claim 1, wherein the first document includes a plurality of checkboxes one of which is checked, and wherein the one or more features include a field for each checkbox, an indication of the field corresponding to the checkbox that is checked, a list of previous activities that predate the first document, and a given expected activity that is associated with the field corresponding to the checkbox that is checked and the list of previous activities.

10. A patent management system comprising:
a server, operatively connected to a network, wherein the server includes:
a processor; and
a memory; and
the processor configured to perform operations comprising:
storing in a docketing system docketing information for a plurality of matters, each of the plurality of matters including a plurality of activities and a plurality of documents;
receiving a first document of the plurality of documents;
identifying one or more docketing activities, associated with the first matter, that are generated in response to receiving the first document;
retrieving a first document from the plurality of documents associated with a first matter of the plurality of matters;
determining a document type of the first document;
extracting one or more features from the first document and the plurality of activities associated with the first matter, the one or more features that are extracted comprising the one or more docketing activities and a title of the first document; and
training a machine learning model, based on the extracted features and the document type of the first document, to determine one or more expected docketing activities for a new document determined to match the document type.

11. The patent management system of claim 10, wherein the processor is further configured to identify one or more deadlines, associated with the first matter, that are generated in response to receiving the first document, wherein the one or more features include the one or more deadlines.

12. The patent management system of claim 10, wherein the processor is further configured to determine a sequence of the one or more activities, wherein the one or more features include the sequence of the one or more activities.

13. The patent management system of claim 10, wherein the processor is further configured to determine a status or age of the first matter, wherein the age is determined based on a filing date associated with the first matter, and wherein the one or more features include the status or age of the first matter.

14. The patent management system of claim 10, wherein the processor is further configured to:
receive a second document associated with a second matter of the plurality of matters;
obtain a list of docketing activities generated for the second matter in response to receiving the second document;
apply the trained machine learning model to the second document to determine one or more expected docketing activities for the second document; and
detect a docketing anomaly in response to determining that the obtained list of docketing activities does not match the one or more expected docketing activities for the second document.

15. The patent management system of claim 10, wherein the processor is further configured to train the machine learning model; based on the one or more features extracted from the first document, to classify a country associated with the first document.

16. The patent management system of claim 15, wherein the classifying the country associated with the first document comprises classifying the first document as a Patent Cooperation Treaty (PCT) document or other document.

17. The patent management system of claim 15, wherein the processor is further configured to:
receive a second document;
determine that the second document has been associated with a given country;
apply the trained machine learning model to the second document to determine an expected country for the second document; and
detect a docketing anomaly in response to determining that the given country associated with the second document does not match the expected country for the second document.

18. A non-transitory computer-readable medium comprising non-transitory computer readable instructions that, when executed by one or more processors, configure the one or more processors to perform operations comprising:
storing, in a docketing system, docketing information for a plurality of matters, each of the plurality of matters including a plurality of activities and a plurality of documents;
receiving a first document of the plurality of documents;
identifying one or more docketing activities, associated with the first matter, that are generated in response to receiving the first document;
retrieving the first document from the plurality of documents associated with a first matter of the plurality of matters;
determining a document type of the first document;
extracting one or more features from the first document and the plurality of activities associated with the first matter, the one or more features that are extracted comprising the one or more docketing activities and a title of the first document; and
training a machine learning model, based on the extracted features and the document type of the first document, to determine one or more expected docketing activities for a new document determined to match the document type.

* * * * *

UNITED STATES PATENT AND TRADEMARK OFFICE
CERTIFICATE OF CORRECTION

PATENT NO. : 10,909,188 B2
APPLICATION NO. : 16/159393
DATED : February 2, 2021
INVENTOR(S) : Lundberg et al.

It is certified that error appears in the above-identified patent and that said Letters Patent is hereby corrected as shown below:

In the Claims

In Column 24, Line 7, in Claim 1, delete "documents:" and insert --documents;-- therefor In Column 24, Line 38, in Claim 4, delete "flatter," and insert --matter,-- therefor In Column 26, Line 13, in Claim 15, delete "model;" and insert --model,-- therefor Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*